UNITED STATES PATENT OFFICE.

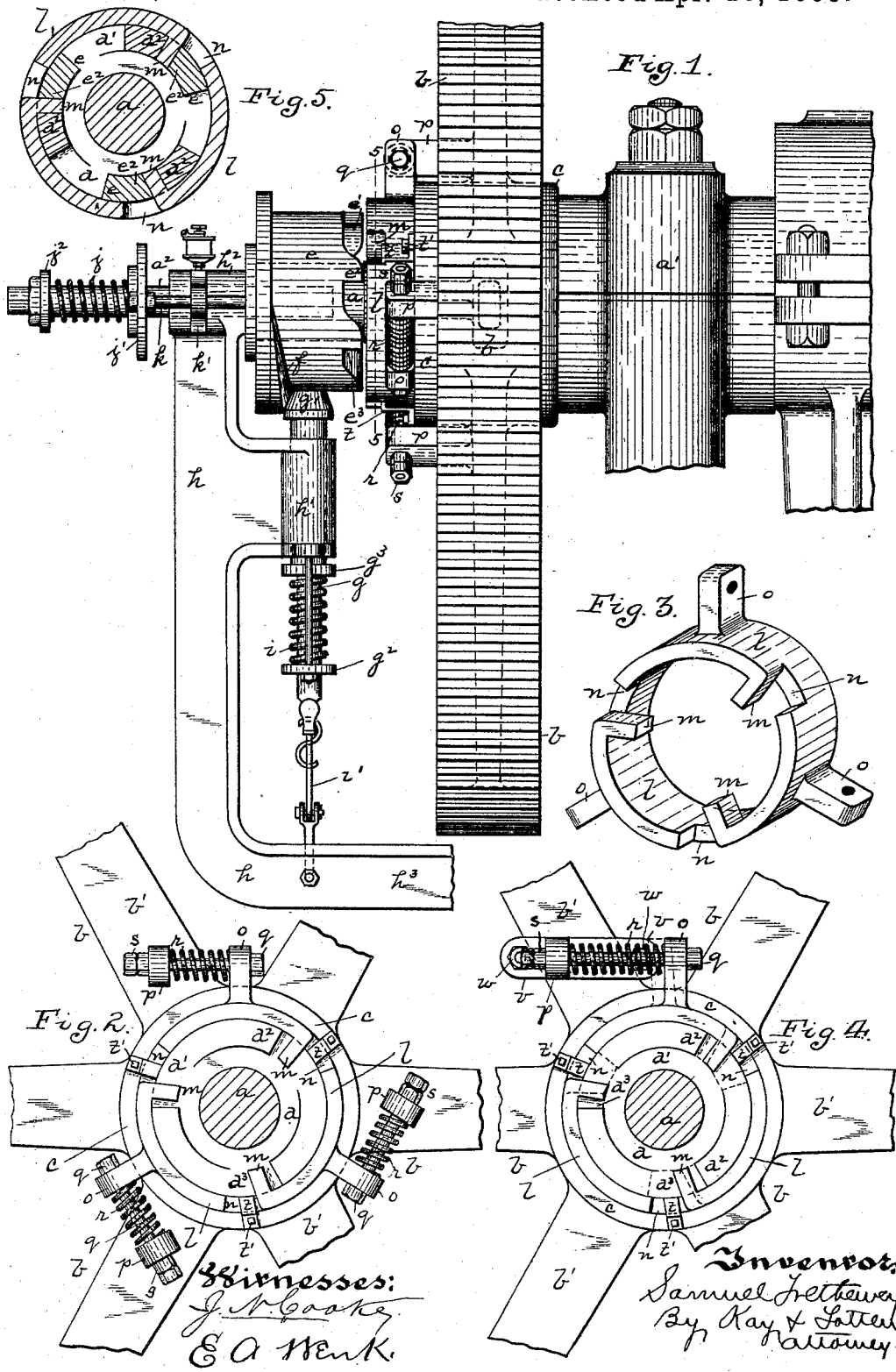

SAMUEL TRETHEWEY, OF PITTSBURG, PENNSYLVANIA, ASSIGNOR TO THE TRETHEWEY MANUFACTURING COMPANY, OF SAME PLACE.

CLUTCH.

SPECIFICATION forming part of Letters Patent No. 495,687, dated April 18, 1893.

Application filed April 16, 1892. Serial No. 429,447. (No model.)

*To all whom it may concern:*

Be it known that I, SAMUEL TRETHEWEY, a resident of Pittsburg, in the county of Allegheny and State of Pennsylvania, have invented a new and useful Improvement in Clutches; and I do hereby declare the following to be a full, clear, and exact description thereof.

My invention relates to clutches, and has special reference to a device for use in connection with the operation of interlocking clutches, or ones in which the clutch members have formed on their coacting faces a series of alternating recesses and shouldered projections, which, when brought into contact, will fit into each other and so act to revolve the shaft on which the clutch is mounted, and so operate the machinery to which it is attached.

The main object of my invention is to provide a clutch which will operate without the sudden jars which have heretofore been found in this class of clutches when the two clutch members were brought into contact with each other, especially when one of the clutch members was spring actuated and thrown into engagement quickly and under great strength, in which case their coacting faces in striking each other would start the machinery with a sudden jar or movement causing great injury to the machinery and a rapid wearing out of the parts composing the clutch mechanism and machinery.

To these ends my invention comprises, generally stated, one or more bars or fingers adapted to extend in front of the shoulders of one clutch member, said bars being yielding or spring actuated, so that they will be compressed against the projections or shoulders thereof, and so act to start the machinery without jar.

It also consists in certain other details of construction which will be more fully hereinafter set forth and claimed.

To enable others skilled in the art to make and use my invention, I will describe the same more fully, referring to the accompanying drawings in which Figure 1 is a side view of my invention showing it applied to a shearing machine. Fig. 2 is an end view of the same, the sliding clutch member being removed therefrom. Fig. 3 is a perspective view of the spring actuated ring. Fig. 4 is a view showing another form in which it can be used, and Fig. 5 is a cross section on line 5—5, Fig. 1, showing the invention applied.

Like letters of reference indicate like parts in each of the figures of the drawings.

My invention is illustrated in connection with the shaft $a$ mounted in the bearing $a'$, and operating any suitable machinery. It has loosely mounted thereon the gear wheel $b$, the said gear wheel $b$ being driven by a small pinion on a power shaft, such as is described in an application filed by me of even date herewith, Serial No. 429,448, or in other suitable way. This gear wheel $b$ has the hub $c$ and the rotary clutch member $d$ formed as part thereof, while on the rotary clutch member is formed one of the coacting faces composing the clutch. This coacting face $d'$ has the projections or shoulders $d^2$ and recesses $d^3$ thereon for engaging with the spring actuated sliding clutch member, as hereinafter described. Sliding on the shaft $a$ by a feather and groove, or other suitable connection, is the spring actuated sliding clutch member $e$ which is operated in any suitable manner, that shown in the drawings being the subject of another application filed by me on December 7, 1891, Serial No. 414,232. On the coacting face $e'$ of the spring actuated sliding clutch member $e$ are the projections or shoulders $e^2$ and recesses $e^3$, the said spring actuated sliding clutch member $e$ having an inclined face $f$ thereon with which a head $g'$ on a spring operated plunger $g$ engages, this spring operated plunger $g$ passing through the bearing $h'$ of the hanger $h$ and having the heavy spring $i$ interposed between the collar $g^2$ suspended from the bearing $h'$ by means of the bolts $g^4$ and the flange $g^3$ on the spring operated plunger $g$, and the said spring operated plunger $g$ being operated by the lever $i'$ fulcrumed in the hanger $h$. The hanger $h$ has the bearing $h^2$ at the top thereof through which passes the auxiliary shaft $a^2$ of the shaft $a$, while confined on the auxiliary shaft $a^2$ between the rigid collar $j^2$ and the loose collar $j'$ is the spiral spring $j$, the said loose collar $j'$ being connected to the spring actuated sliding clutch member *e* by bolts *k* passing through lugs *k'* on the bearing $h^2$ of the hanger *h* which is attached to the machine to be operated by the projection $h^3$ at the bottom thereof.

Fitting loosely around the rotary clutch member *d* and abutting against the hub *c* is the annular ring *l* which is preferably made of wrought metal to withstand the shocks and strains brought upon it when the clutch is put in operation. It has the bars or fingers *m* thereon, they being preferably cut out of the annular ring *l* at *n* so that they will not be so liable to break upon engagement, as they are formed of the same body of metal; and they extend down into the recesses $d^3$ in front of and a short distance away from the projections or shoulders $d^2$ of the coacting face of the rotary clutch member *d*. Extending out from the annular ring *l* are the standards *o*, while the lugs *p* are formed on the spokes *b'* of the gear wheel *b*, and bolts *q* pass through the standards *o* and lugs *p*. Confined around the bolts *q* and interposed between the standards *o* and lugs *p* are the springs *r*, three of such springs being shown in the drawings, although any number can be used, one being shown in Fig. 4. These springs *r* are preferably made heavy, as they are required to stand severe strains, and have but little movement. The tension of the springs *r* is regulated by the nuts *s* on the bolts *q* so as to allow for the amount of compression required.

In order to hold the annular ring *l* in place upon the rotary clutch member *d*, I have provided the clips *t* which fit around the seats *n* of the annular ring *l* and are bolted to the hub *c* at *t'*, so holding the annular ring *l* in place and permitting it to move freely during the operation of the clutch.

In Fig. 4 I have illustrated another form of connecting the springs *r* to the gear wheel *b*, which consists in placing the clamp *v* around the spokes *b'* of the gear wheel *b* by bolts *w* passing through the same and having the lugs *p* formed as part thereof, such clamps being employed where the apparatus is applied to clutch mechanism not specially prepared for its use.

The operation of my improved clutch is as follows:—As shown in Fig. 1, the clutch is at rest with the large gear wheel *b* continually revolving, the spring actuated sliding clutch member *e* being passed back out of engagement with the rotary clutch member *d* by the head *g'* of the spring operated plunger *g* which is at the highest point of the inclined face *f* on the spring actuated sliding clutch member *e*, so compressing the spring *j* back against the rigid collar $j^2$ through the medium of the loose collar *j'* and bolts *k*. When it is desired to operate the clutch and revolve the machinery, the operator by grasping the lever *i'* and pulling it down allows the head *g'* of the spring operated plunger *g* to free itself from the inclined face *f*, when the sliding clutch member *e* will, on account of the compression of the spring *j*, quickly engage with the rotary clutch member *d*, their coacting faces *e' d'* fitting within each other through the medium of the projections $e^2 d^2$ and recesses $e^3 d^3$, the projections $e^2$ striking against the bars or fingers *m* on the annular ring *l* and forcing them against the shoulders $d^2$ on the rotary clutch member *d*, the action being that the heavy springs *r* are gradually compressed, and instead of starting the machine with a sudden jar, the pressure of the spring bars upon the clutch face of the other member *e* causes the gradual starting of the shaft *a* and the mechanism operated thereby, and when the spring bars are forced back against the shoulders of the clutch member *d* they are clamped between the shoulders of the two clutch members, and a positive solid, metal to metal, connection between the clutch members is obtained. When the sliding clutch member is withdrawn, the spring bars or fingers *m* are released from contact with the projection $d^2$ and return to their normal position in the recesses $d^3$, the annular ring *l* sliding back through the clips *t* so releasing the springs *r* from their compression, when the clutch mechanism is again ready for another operation. The sliding clutch member can, of course, be operated by any suitable mechanism.

It will thus be seen that my improved clutch is simple in its construction, strong in its parts, and not liable to get out of order. It does away with the large amount of friction usually frequent in the operation of these clutches; and also the noise, strains and jars which are caused by the striking of the coacting faces against each other during the operation of the clutch mechanism.

What I claim as my invention, and desire to secure by Letters Patent, is—

1. In clutches, the combination with one clutch member, of one or more yielding bars or fingers adapted to extend in front of said clutch member, and another clutch member adapted to press the bars or fingers against the first clutch member, substantially as and for the purposes set forth.

2. In clutches, the combination with one clutch member, of an annular ring fitting around the same and having one or more yielding bars or fingers adapted to extend in front of said clutch member, and another clutch member adapted to press the bars or fingers against the first clutch member, substantially as and for the purposes set forth.

3. In clutches, the combination with one clutch member, of an annular ring journaled around the same and having one or more bars or fingers rigid therewith and adapted to extend in front of said clutch member, said ring being spring actuated, and another clutch member adapted to press the bars or fingers against the first clutch member, substantially as and for the purposes set forth.

4. The combination with a wheel, having a clutch member thereon, of an annular ring journaled around the said clutch member, said annular ring having one or more standards thereon, and one or more springs confined between said standards, and a lug or lugs on said wheel, substantially as and for the purposes set forth.

5. The combination with a wheel having a clutch member thereon, of an annular ring journaled around the said clutch member, and having clips on said wheel extending over the ring for holding it in place, substantially as and for the purposes set forth.

6. The combination with a wheel having a clutch member thereon, of an annular ring journaled around the said clutch member, said annular ring having one or more standards thereon, a clamp or clamps on said wheel, having a lug or lugs thereon and one or more springs interposed between said standards and lug or lugs, substantially as and for the purposes set forth.

In testimony whereof I, the said SAMUEL TRETHEWEY, have hereunto set my hand.

SAMUEL TRETHEWEY.

Witnesses:
J. N. COOKE,
ROBT. D. TOTTEN.